Patented Nov. 16, 1926.

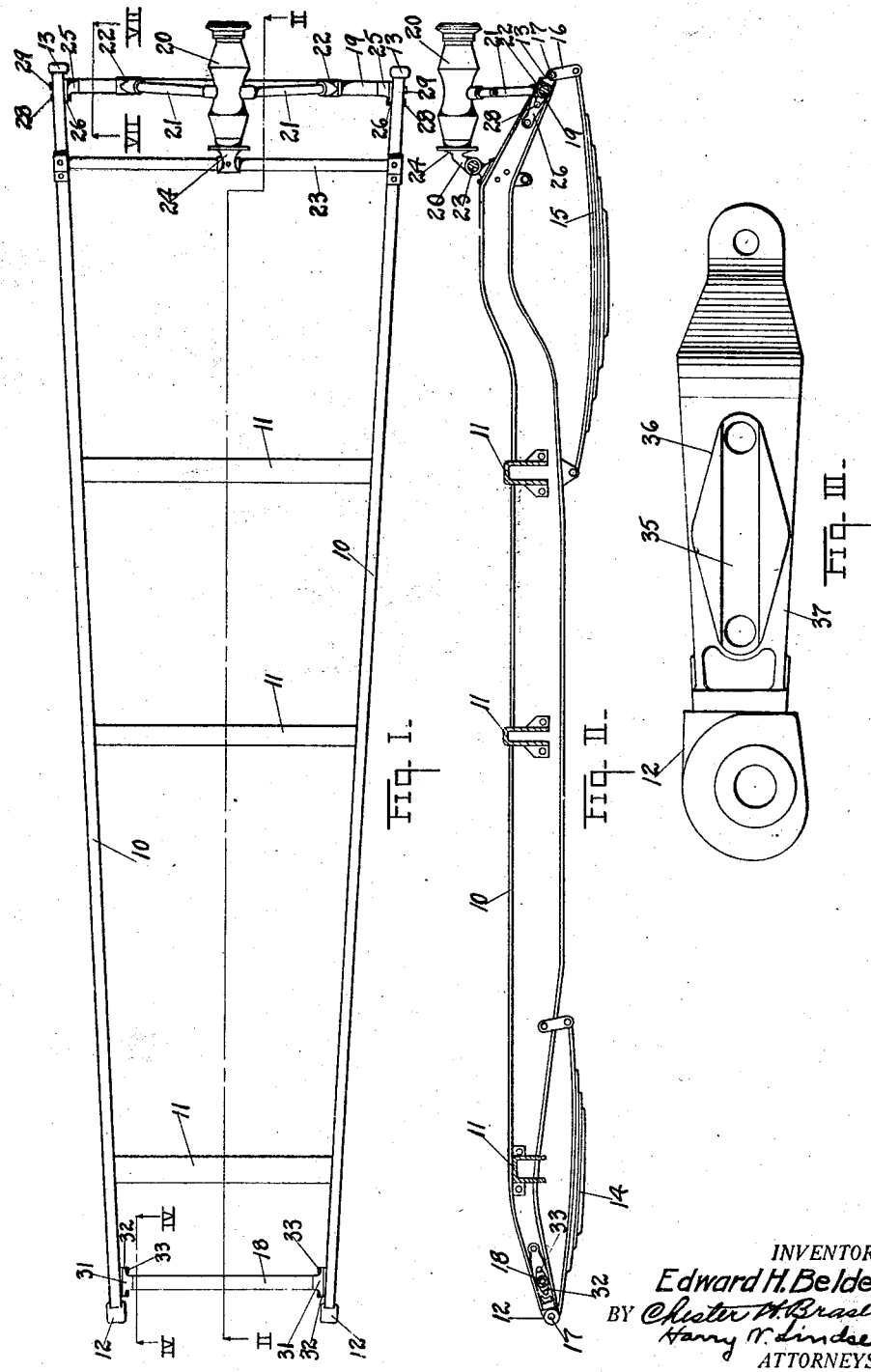

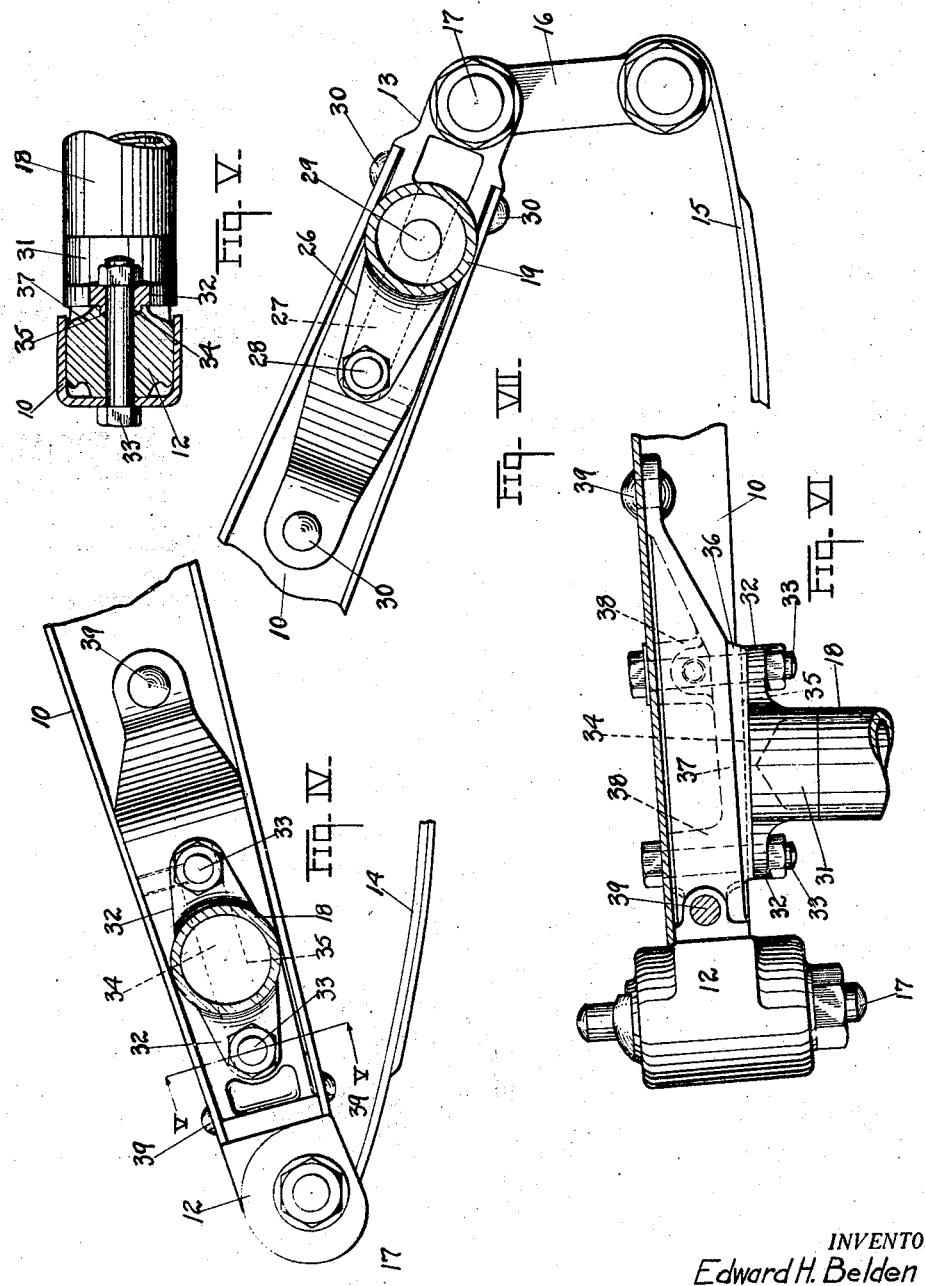

1,607,147

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

VEHICLE-FRAME CONSTRUCTION.

Application filed May 21, 1920. Serial No. 383,261.

The present invention relates to vehicle frames and has for its object to provide an improved frame construction for automobiles or other vehicles having permanently connected side frame members with removable tie bars or connections adjacent its ends which may be detached without dismantling the frame or disconnecting the permanently attached transverse tie or brace members.

Another object of the invention is to provide, at the front end of the frame and in front of the radiator, a removable tie member which will afford a certain amount of protection to the radiator and which may be quickly removed and replaced when bent without disturbing or dismantling the remaining parts of the frame.

Another object of the invention is to provide, at the rear of the frame, a removable tie member adapted to support a wheel or tire carrier of any preferred construction which may be removed with the tie member as a unit.

Still another object of the invention is to provide a cross bar in combination with a removable tie member for supporting a wheel or tire carrier between the ends of the side frame members of the vehicle, the carrier being detachably connected with said cross bar and adapted to swing upon said carrier which, together with the carrier, may be removed from the side frame members as a unit.

Another object of the invention is to provide an improved spring shackle bracket at the ends of the side frame members which will serve both as a support for the outer ends of the springs and as a connection for a removable transverse tie to permit the same to be removed laterally from between the side frame members of the vehicle.

Another object of the invention is to provide at the ends of the side frame members of the vehicle, brackets for supporting a transverse removable tie member, the construction being such as to relieve the strain upon the bolts connecting the tie member with the brackets when the frame is subjected to twisting strains from time to time.

With these and other objects in view, the invention comprises certain novel features of construction and arrangement of parts which will be hereinafter more fully pointed out and claimed, it being understood that the construction is susceptible to various modifications or changes in the detailed forms of application, without departing from the spirit of the invention as expressed in the claims.

A construction constituting one embodiment of the invention is illustrated in the accompanying drawings in which:

Figure I is a plan view of a vehicle frame embodying the invention.

Figure II is a sectional elevation taken on line II—II of Figure I.

Figure III is a detailed view of one of the spring shackle brackets shown at the left of Figure II.

Figure IV is an enlarged fragmentary sectional elevation taken on line IV—IV of Figure I.

Figure V is a detailed section taken on line V—V of Figure IV.

Figure VI is a top plan view of the bracket shown in Figure IV with the side frame channel shown in section.

Figure VII is a sectional elevation taken on line VII—VII of Figure I.

Like reference characters throughout the several views of the drawings indicate corresponding parts.

The structure illustrated in the drawings comprises the usual side frame channels 10 of the vehicle frame, which may be permanently connected by any number of suitable transverse brace members 11 as shown in Figures I and II. The side frame channels have their flanges turned inwardly and at their ends are adapted to receive the front and rear spring shackle brackets 12 and 13 respectively with which the outer ends of the springs 14 and 15 are connected in the usual manner. Spring 15 is connected to shackle bracket 13 by means of the links 16 and the bolts 17. The front shackle brackets 12 are connected by a removable tie member 18, while the rear shackle brackets 13 are connected by a removable tie member 19. The tie member 19 is adapted to support a wheel or tire carrier such as is indicated at 20, which is provided with downwardly extending inclined braces 21 pivotally connected at 22 to the tie member 19 in such a manner as to permit the carrier to rotate upon the tie member in order that it may be swung downwardly when it is disconnected from the transverse bar 23, positioned in front of the tie member as shown in Figures I and II.

While I have shown in the drawings a wheel carrier adapted for supporting two spare wheels, it will be understood that a tire carrier may be readily substituted therefor if desired. The wheel carrier shown in Figure I is detachably connected with the brace member 23, preferably by means of the bracket 24, but may be connected therewith by any other suitable means. The transverse tie member 19 is preferably of tubular construction, and at its ends is provided with the cast members 25 having the laterally projecting feet 26 provided with ribs or tongues 27 on their outer faces which are disposed within grooves or recesses formed in the spring shackle brackets 13 in a manner similar to that shown in Figure V, showing the front end construction. The castings 25 are connected with the tube 19, preferably by spot-welding, but may be connected thereto by any other suitable means. and are secured to the shackle brackets by means of bolts 28 which pass through the shackle brackets and side channels as indicated in Figures I and VII. A bolt 29 is also extended through the web of the channel 10 and through the bracket 13 and into the casting 25 in threaded engagement therewith. Removal of the transverse tie member 19 may be effected by unscrewing and removing the bolts 28 and 29 and then pushing the tie member forwardly until the tongues or ribs 27 are moved out of the grooves in the brackets 13, it being understood of course that the wheel carrying member 20 will first be disconnected from the brace bar 23 to permit the sliding forwardly of the tie member 19. The tie member, including the castings on the ends thereof, may then be freely moved laterally from between the side channels 10 as the distance between the flanges of the channels is greater than the overall length of the tie member. The shackles 13 are preferably secured to the channels 10 by means of the rivets 30, as indicated in Figure VII. The shackles 12 at the front end of the frame are similar in construction to those at the rear thereof, the principal difference being in the position of the bolts connecting the removable tie member with the brackets. The tie member at the front of the frame comprises the tube 18 upon the ends of which are welded or otherwise secured, the castings 31 having the laterally projecting lugs 32 which are connected with the shackle bracket 12 and side frame channels by means of the bolts 33 as indicated in Figure VI. The castings 31 are provided with tongues or ribs 34 projecting into grooves 35 formed in the boss-like projections 36 on the inner face of the wall 37 of the bracket which is spaced from the web of the channel 10 as indicated by dotted lines in Figure VI. The shackle brackets 12 are also provided with projections 38 which are seated upon the inner faces of the webs of the channels and through which extend the bolts 33 serving to connect the tie member with the side channels and with the brackets. The tie member 18 is readily removed from the frame by removing the bolts 33 and then sliding it rearwardly until the tongues thereon move out of the grooves in the shackle brackets. The overall length of a removable tie member 18 including the end members 31 is preferably slightly less than the distance between the flanges of the side frame channels 10 in order to permit the tie member to be removed laterally from the channels. The shackle brackets 12 are permanently connected with the side frame channels by means of the rivets 39 as shown in Figures IV and VI.

As stated before the tie member 18 serves to protect the front of the automobile, particularly the radiator and also serves to prevent any twisting or distortion of the ends of the side frame channels by reason of the tongue and groove or key and slot arrangement between the ends of the tie and the shackle brackets. By this construction the bolts are relieved of all twisting strains set up in the frame from time to time, the same being true with respect to the rear tie member 19 carrying the wheel support 20.

While I have described my invention more or less in detail, it will be understood that I do not wish to be limited to the specific construction and arragement of parts shown, as it will be apparent that various modifications may be made in the detail construction and manner of assembling the parts without departing from the spirit of the invention as expressed in the claims.

What I claim as new and desire to secure by Letters Patent is:

1. A vehicle frame structure comprising side frame members, spring brackets mounted upon said frame members, a transverse tie interposed between said brackets having at each end a laterally extending portion, said brackets and laterally extending portion being provided with complementary ribs and grooves running lengthwise of said laterally extending end portions and transversely of said tie, whereby the tie is made removable, and means projecting through said laterally extending end portions for securing the tie to said brackets.

2. In a vehicle frame structure, a pair of side frame members rigidly secured together intermediate their ends, spring shackle brackets at corresponding ends of said members, a tie-rod for said frame members having a terminal portion at each end thereof provided with a laterally extending ear, the end faces of said terminal portions being adapted to slide into and out of engagement with the opposed faces of said brackets whereby to permit removal of the tie-rod without removal of the brackets, and bolts passing through said ear for securing said tie-rod to said brackets.

In testimony whereof, I affix my signature.

EDWARD H. BELDEN.